US007885265B2

(12) United States Patent
Usuda et al.

(10) Patent No.: US 7,885,265 B2
(45) Date of Patent: Feb. 8, 2011

(54) TRANSMISSION CONTROL METHOD, MOBILE STATION, RADIO BASE STATION, AND RADIO NETWORK CONTROLLER

(75) Inventors: Masafumi Usuda, Tokyo (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 784 days.

(21) Appl. No.: 11/511,217

(22) Filed: Aug. 29, 2006

(65) Prior Publication Data

US 2007/0064708 A1    Mar. 22, 2007

(30) Foreign Application Priority Data

Aug. 30, 2005    (JP)    ............................ P2005-250389

(51) Int. Cl.
H04L 12/28 (2006.01)
H04J 3/24 (2006.01)
H04W 4/00 (2009.01)
H04W 72/00 (2009.01)

(52) U.S. Cl. .................. 370/394; 370/349; 370/329; 370/474; 455/450; 455/452

(58) Field of Classification Search ................ 370/328, 370/335, 479, 242, 342, 329, 336, 337, 348, 370/349, 394, 474; 455/509, 510, 517, 450, 455/452.1, 452.2

See application file for complete search history.

(56) References Cited

U.S. PATENT DOCUMENTS

| 7,158,504 | B2 * | 1/2007 | Kadaba et al. | ............... 370/348 |
| 7,447,504 | B2 * | 11/2008 | Lohr et al. | ................... 455/450 |
| 2002/0172217 | A1 | 11/2002 | Kadaba et al. | |
| 2004/0162083 | A1 * | 8/2004 | Chen et al. | .................. 455/454 |
| 2005/0250497 | A1 * | 11/2005 | Ghosh et al. | ................ 455/436 |
| 2006/0072503 | A1 * | 4/2006 | Kim et al. | ................... 370/329 |

(Continued)

FOREIGN PATENT DOCUMENTS

EP    1672941 A    6/2006

(Continued)

OTHER PUBLICATIONS

3GPP TSG-RAN Working Group2 #47 R2-051284; May 9-13, 2005; Athens, Greece; Agenda item: 12.2 (Open Item 5.9); Source: NEC; Title: HARQ reservation for NST; Document for: Discussion and Approval.

(Continued)

Primary Examiner—Huy Phan
Assistant Examiner—Kuo Woo
(74) Attorney, Agent, or Firm—Marvin A. Motsenbocker; Mots Law, PLLC

(57) ABSTRACT

A transmission control method for uplink user data in a mobile communication system in which a plurality of HARQ processes is applied to the uplink user data, includes: classifying, at the radio network controller, each HARQ process into any of a scheduled transmission process, a non-scheduled transmission process, or a scheduled and non-scheduled transmission process in which either of the scheduled transmission or the non-scheduled transmission is performed; notifying, at the radio network controller, the classification result to the mobile station; and transmitting, at the mobile station, the uplink user data in each HARQ process to the radio base station using the scheduled transmission or the non-scheduled transmission, based on the notified classification result.

4 Claims, 13 Drawing Sheets

U.S. PATENT DOCUMENTS

2006/0256756 A1   11/2006   Wakabayashi

FOREIGN PATENT DOCUMENTS

| JP | 2001-519123 A | 10/2001 |
|---|---|---|
| JP | 2005/034545 A | 4/2005 |
| WO | 9845966 A | 10/1998 |
| WO | 2005/018115 A | 2/2005 |

OTHER PUBLICATIONS

Universal Mobile Telecommunications System (UMTS); FDD enhanced uplink; Overall description; Stage 2 (3GPP TS 25.309 version 6.2.0 Release 6); Mar. 2005, ETSI Standards, European Telecommunications Standards Institute, Sophia-Antipo, FR, XP014027653.

"3rd Generation Partnership Project; Technical Specification Group Radio Access Network; FDD Enhanced Uplink; Overall description; Stage 2 (Release 6);3GPP TS 25. 309" 3GPP TS 25. 309 V6.3.0, Jun. 30, 2005.

"Universal Mobile Telecommunications Systems (UMTS)" Mar. 2005, ETSI Standards, European Telecommunications Standards Institute, Sophia-Antipo, Fr. XP014027653 ISSN: 0000-0001 Paragraphs [0006]-[0010].

\* cited by examiner

TRANSMISSION CONTROL METHOD, MOBILE STATION, RADIO BASE STATION, AND RADIO NETWORK CONTROLLER

CROSS REFERENCE TO RELATED APPLICATION

This application is based upon and claims the benefit of priority from the prior Japanese Patent Application No. P2005-250389, filed on Aug. 30, 2005; the entire contents of which are incorporated herein by reference.

BACKGROUND OF THE INVENTION

1. Field of the Invention

The present invention relates to a transmission control method for uplink user data in a mobile communication system in which a plurality of HARQ processes are applied to the uplink user data to be transmitted from a mobile station to a radio base station, and a mobile station, a radio base station, and a radio network controller used in the transmission control method.

2. Description of the Related Art

In a conventional mobile communication system, when setting a Dedicated Physical Channel (DPCH) between a mobile station UE and a radio base station Node B, a radio network controller RNC is configured to determine a transmission rate of uplink user data, in consideration of hardware resources for receiving of the radio base station Node B (hereinafter, hardware resource), a radio resource in an uplink (an interference volume in an uplink), a transmission power of the mobile station UE, a transmission processing performance of the mobile station UE, a transmission rate required for an upper application, or the like, and to notify the determined transmission rate of the uplink user data by a message of a layer-3 (Radio Resource Control Layer) to both of the mobile station US and the radio base station Node B.

Here, the radio network controller RNC is provided at an upper level of the radio base station Node B, and is an apparatus configured to control the radio base station Node B and the mobile station UE.

In general, data communications often cause burst traffic compared with voice communications or TV communications. Therefore, it is preferable that a transmission rate of a channel used for the data communications is changed fast.

However, as shown in FIG. 1, the radio network controller RNC integrally controls a plurality of radio base stations Node B in general. Therefore, in the conventional mobile communication system, there has been a problem that it is difficult to perform fast control for changing of the transmission rate of uplink user data (for example, per approximately 1 through 100 ms), due to the increase of processing load and processing delay in the radio network controller RNC.

In addition, in the conventional mobile communication system, there has been also a problem that costs for implementing an apparatus and for operating a network are substantially increased even if the fast control for changing of the transmission rate of the uplink user data can be performed.

Therefore, in the conventional mobile communication system, control for changing of the transmission rate of the uplink user data is generally performed on the order from a few hundred ms to a few seconds.

Accordingly, in the conventional mobile communication system, when burst data transmission is performed as shown in FIG. 2A, the data are transmitted by accepting low-speed, high-delay, and low-transmission efficiency as shown in FIG. 2B, or, as shown in FIG. 2C, by reserving radio resources for high-speed communications to accept that radio bandwidth resources in an unoccupied state and hardware resources in the radio base station Node B are wasted.

It should be noted that both of the above-described radio bandwidth resources and hardware resources are applied to the vertical radio resources in FIGS. 2B and 2C.

Therefore, the 3rd Generation Partnership Project (3GPP) and the 3rd Generation Partnership Project 2 (3GPP2), which are international standardization organizations of the third generation mobile communication system, have discussed a method for controlling radio resources at high speed in a layer-1 and a media access control (MAC) sub-layer (a layer-2) between the radio base station Node B and the mobile station UE, so as to utilize the uplink radio resources effectively. Such discussions or discussed functions will be hereinafter referred to as "Enhanced Uplink (EUL)".

In the mobile communication system to which the "Enhanced Uplink" is applied, either of a scheduled transmission or a non-scheduled transmission is performed.

In the scheduled transmission, each of upper layer flow will be transmitted, based on the transmission allocation by the radio base station Node B.

In the non-scheduled transmission, each of upper layer flow will be transmitted automatically without following the transmission allocation by the radio base station Node B.

Against the general upper layer flow (uplink user data), the scheduled transmission is performed.

On the other hand, against the upper layer flow which has the strict requirements regarding the transmission delay, such as voice information, control information, or the like, the non-scheduled transmission is performed.

However, in the non-scheduled transmission, it is required to reserve hardware resources in advance. Accordingly, the unnecessary non-scheduled transmission will cause a waste of hardware resources.

In addition, in the mobile communication system to which the conventional "Enhanced Uplink" is applied, a "non-scheduled transmission reserved process" and a "non-scheduled transmission limited process" are existed as a HARQ process.

In the "non-scheduled transmission reserved process", it is configured that only the non-scheduled transmission can be performed.

In the "non-scheduled transmission limited process", it is configured that the non-scheduled transmission will not be performed in all HARQ processes other than the HARQ process to which the "non-scheduled transmission limited process" is applied.

Referring to FIG. 3, an example when the process #1 and the process #2 are set as the "non-scheduled transmission reserved process" in the HARQ having 6 processes.

In the above case, as shown in FIG. 3, the non-scheduled transmission can be performed in every process. However, the scheduled transmission can be performed in the process #3 to the process #6 only.

As a result, the radio base station Node B can control a transmission rate of the scheduled transmission less than an absolute transmission rate of uplink user data, which is notified by using an "Enhanced Absolute Grant Channel (E-AGCH)", and the like.

Accordingly, the radio base station Node B can make the mobile station UE to transmit the uplink user data using the transmission rate of the scheduled transmission which differs per the mobile station UE, so that the radio base station Node B can allocate the appropriate transmission rate of the uplink user data to each mobile station UE, even when the radio base station Node B signals the absolute transmission rate of the uplink user data which is common to each mobile station UE.

Referring to FIG. 4, an example when the process #1 and the process #2 are set as the "non-scheduled transmission limited process" in the HARQ having 6 processes.

In the above case, as shown in FIG. 4, the non-scheduled transmission can be performed in the process #1 and the process #2 only.

As a result, the radio base station Node B has to prepare the hardware resources for reception in the process #1 and the process #2, in which the non-scheduled transmission will be performed, only. Therefore, hardware resources can be used effectively.

As described above, in the mobile communication system to which the conventional "Enhanced Uplink" is applied, it is possible to set the transmission rate of the scheduled transmission in each mobile station UE appropriately, by using the "non-scheduled transmission reserved process" as HARQ process.

In the meanwhile, in the mobile communication system to which the conventional "Enhanced Uplink" is applied, it is possible to decrease the amount of hardware resources for reception to be prepared for the non-scheduled transmission, by using the "non-scheduled transmission limited process" as HARQ process.

However, in the mobile communication system to which the conventional "Enhanced Uplink" is applied, there has been a problem that it is not possible to simultaneously set the transmission rate of the scheduled transmission appropriately and decrease hardware resources for reception in the non-scheduled transmission.

BRIEF SUMMARY OF THE INVENTION

The present invention has been made considering the problems, and its object is to provide a transmission control method for uplink user data which enables to simultaneously decrease hardware resources for reception in a non-scheduled transmission and set transmission rate of a scheduled-transmission appropriately, and a mobile station, a radio base station, and a radio network controller.

A first aspect of the present invention is summarized as a transmission control method for uplink user data in a mobile communication system in which a plurality of HARQ processes is applied to the uplink user data to be transmitted from a mobile station to a radio base station, including: classifying, at the radio network controller, each HARQ process into any of a scheduled transmission process in which a scheduled transmission for transmitting the uplink user data based on a transmission allocation by the radio base station is performed, a non-scheduled transmission process in which a non-scheduled transmission for transmitting the uplink user data automatically without following the transmission allocation by the radio base station is performed, or a scheduled and non-scheduled transmission process in which either of the scheduled transmission or the non-scheduled transmission is performed; notifying, at the radio network controller, the classification result to the mobile station; and transmitting, at the mobile station, the uplink user data in each HARQ process to the radio base station using the scheduled transmission or the non-scheduled transmission, based on the notified classification result.

A second aspect of the present invention is summarized as a mobile station used in a mobile communication system in which a plurality of HARQ processes is applied to the uplink user data to be transmitted from the mobile station to a radio base station, including: a classification result receiver configured to receive a classification result in which each HARQ process is classified into any of a scheduled transmission process in which a scheduled transmission for transmitting the uplink user data based on a transmission allocation by the radio base station is performed, a non-scheduled transmission process in which a non-scheduled transmission for transmitting the uplink user data automatically without following the transmission allocation by the radio base station is performed, or a scheduled and non-scheduled transmission process in which either of the scheduled transmission or the non-scheduled transmission is performed, by a radio network controller; and an uplink user data transmitter configured to transmit the uplink user data in each HARQ process to the radio base station using the scheduled transmission or the non-scheduled transmission, based on the classification result notified from the radio network controller.

A third aspect of the present invention is summarized as a radio base station used in a mobile communication system in which a plurality of HARQ processes is applied to the uplink user data to be transmitted from the mobile station to a radio base station, including: a classification result receiver configured to receive a classification result in which each HARQ process is classified into any of a scheduled transmission process in which a scheduled transmission for transmitting the uplink user data based on a transmission allocation by the radio base station is performed, a non-scheduled transmission process in which a non-scheduled transmission for transmitting the uplink user data automatically without following the transmission allocation by the radio base station is performed, or a scheduled and non-scheduled transmission process in which either of the scheduled transmission or the non-scheduled transmission is performed, by a radio network controller; and a transmission allocator configured to perform transmission allocation to the uplink user data in each HARQ process to the mobile station, based on the classification result notified from the radio network controller.

A fourth aspect of the present invention is summarized as a radio network controller used in a mobile communication system in which a plurality of HARQ processes is applied to uplink user data to be transmitted from the mobile station to a radio base station, including: a classifier configured to classify each HARQ process into any of a scheduled transmission process in which a scheduled transmission for transmitting the uplink user data based on a transmission allocation by the radio base station is performed, a non-scheduled transmission process in which a non-scheduled transmission for transmitting the uplink user data automatically without following the transmission allocation by the radio base station is performed, or a scheduled and non-scheduled transmission process in which either of the scheduled transmission or the non-scheduled transmission are performed; and a notifier configured to notify a classification result to the mobile station.

DETAILED DESCRIPTION OF THE INVENTION

Configuration of Mobile Communication System According to First Embodiment of the Present Invention Referring to FIGS. 5 to 17, a configuration of a mobile communication system according to a first embodiment of the present invention will be described.

It should be noted that, the mobile communication system according to this embodiment is designed in order to increase a communication performance such as a communication capacity, a communication quality and the like. Further, the mobile communication system according to this embodiment can be applied to "W-CDMA" and "CDMA2000" of the third generation mobile communication system.

Figure 1:
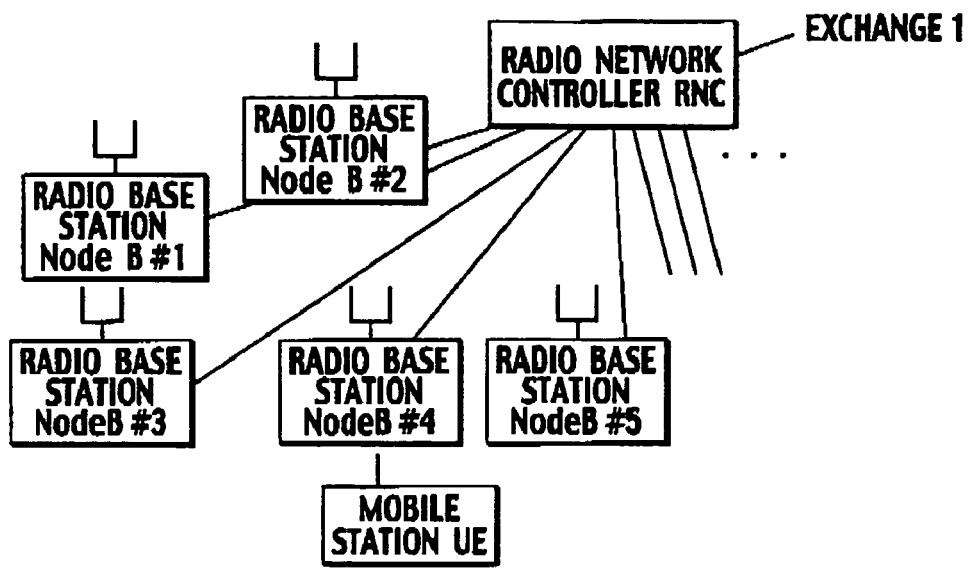
FIG. 1 is diagram of an entire configuration of a general mobile communication system.
Figure 2A:
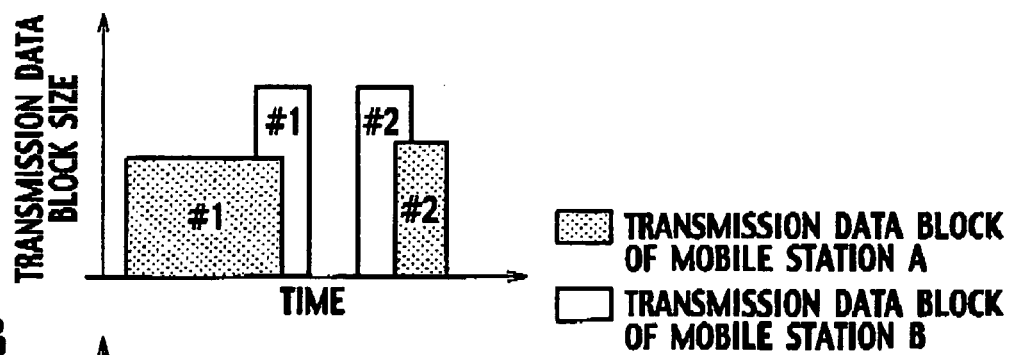
FIGS. 2A to 2C are graphs for explaining the method for controlling a transmission rate of uplink user data in a conventional mobile communication system.
Figure 2B:
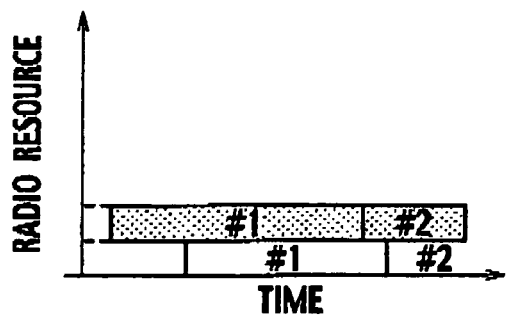
Figure 2C:
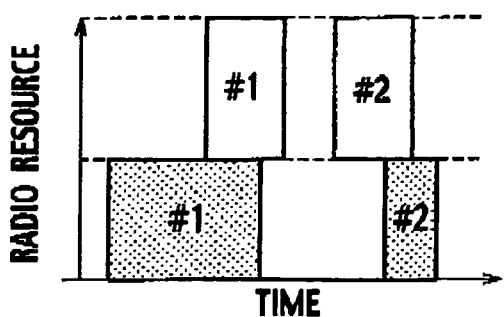
Figure 3:
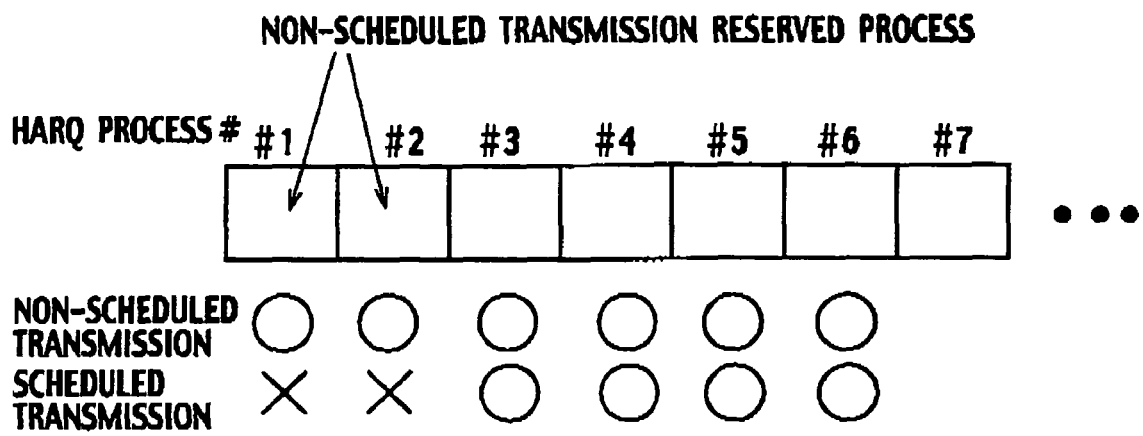
FIG. 3 is a diagram showing an operation of HARQ having 6 processes according to the conventional mobile communication system.
Figure 4:
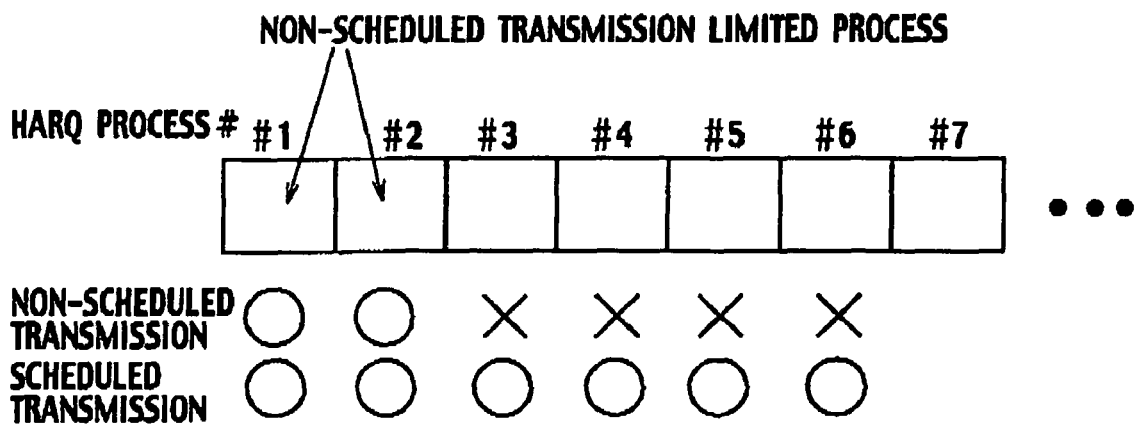
FIG. 4 is a diagram showing an operation of HARQ having 6 processes according to the conventional mobile communication system.
Figure 5:
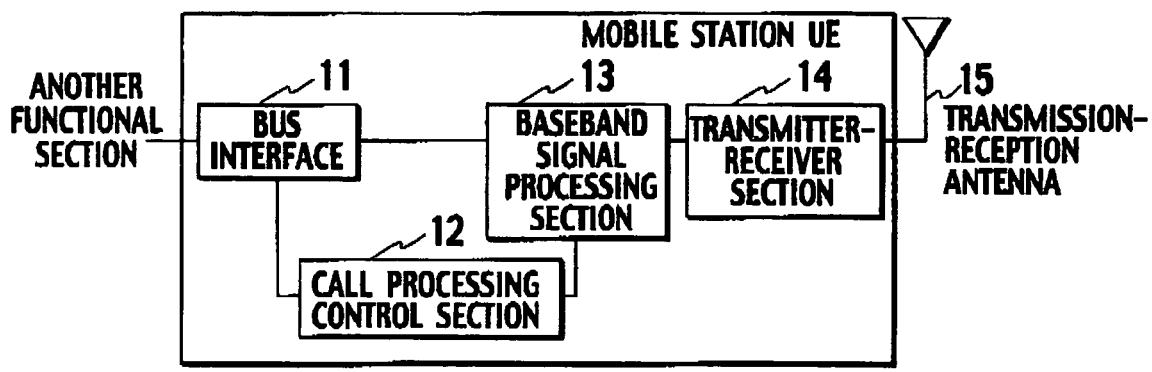
FIG. 5 is a functional block diagram of a mobile station in a mobile communication system according to a first embodiment of the present invention.

An example of general configuration of a mobile station UE according to this embodiment is shown in FIG. 5.

As shown in FIG. 5, the mobile station UE is provided with a bus interface 11, a call processing control section 12, a baseband signal processing section 13, a transmitter-receiver section 14, and a transmission-reception antenna 15. In addition, the mobile station UE can be configured to include an amplifier section (not shown in FIG. 5).

However, these functions do not have to be independently present as hardware. That is, these functions can be partly or entirely integrated, or can be configured through a process of software.

Figure 6:
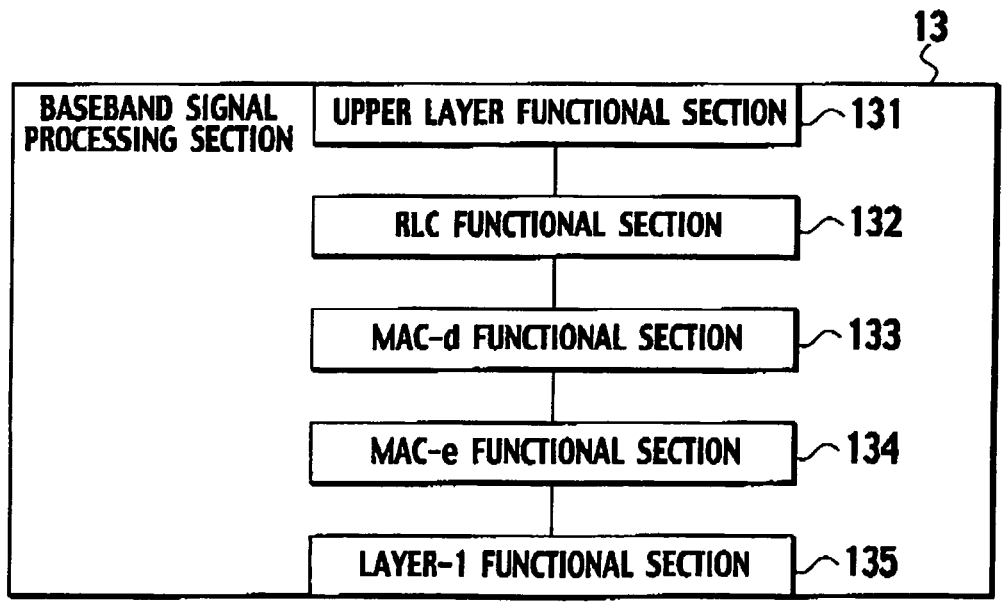
FIG. 6 is a functional block diagram of a baseband signal processing section of the mobile station in the mobile communication system according to the first embodiment of the present invention.

In FIG. 6, a functional block of the baseband signal processing section 13 is shown.

As shown in FIG. 6, the baseband signal processing section 13 is provided with an upper layer functional section 131, a RLC functional section 132, a MAC-d functional section 133, a MAC-e functional section 134, and a layer-1 functional section 135.

The RLC functional section 132 is configured to work as a RLC sublayer. The layer-1 functional section 135 is configured to work as a layer-1.

Figure 7:
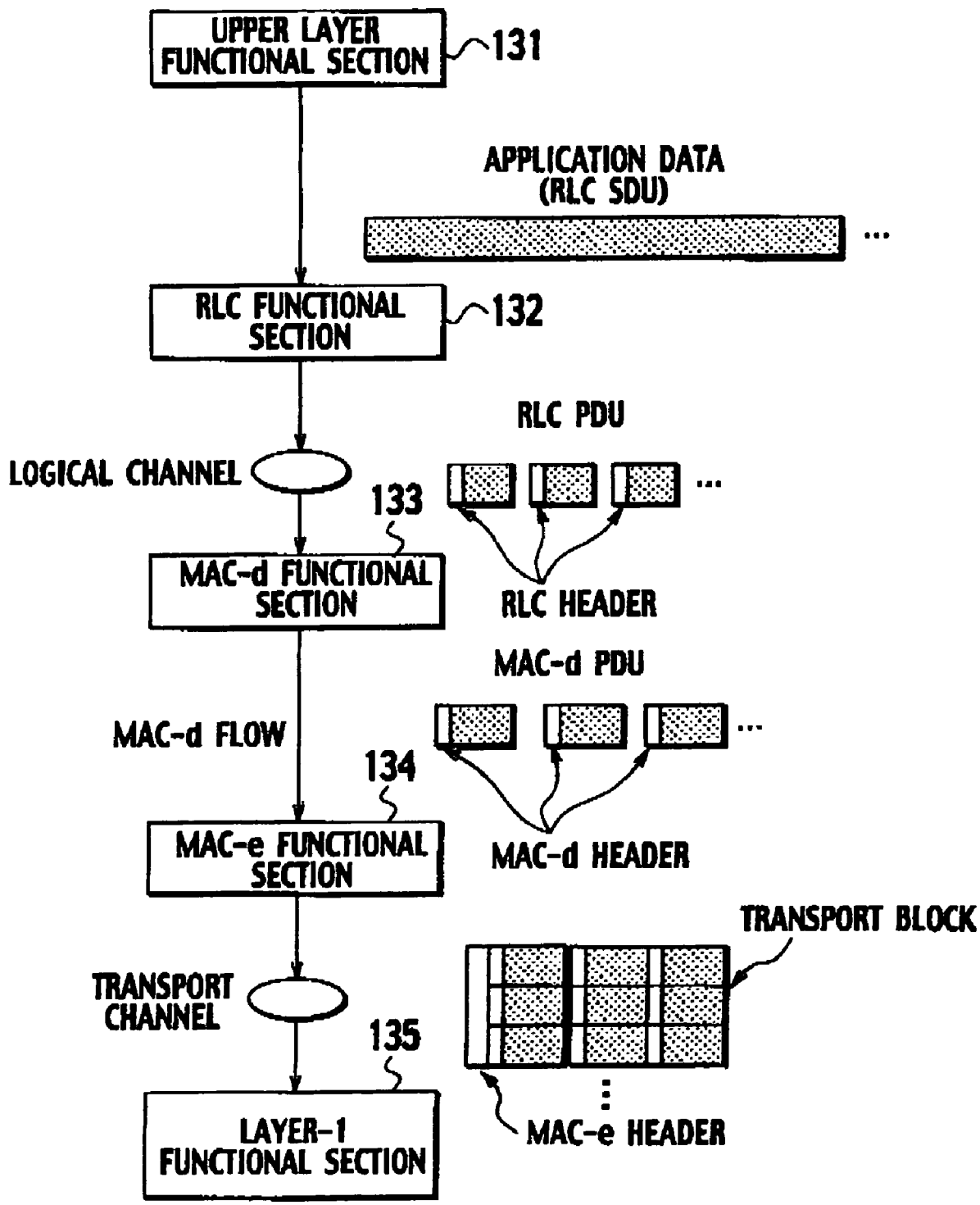
FIG. 7 is a diagram for explaining functions of the baseband signal processing section of the mobile station in the mobile communication system according to the first embodiment of the present invention.

As shown in FIG. 7, the RLC functional section 132 is configured to divide an application data (RLC SDU), which is received from the upper layer functional section 131, into PDUs of a predetermined PDU size. Then, the RLC functional section 132 is configured to generate RLC PDUs by adding a RLC header used for a sequence control processing, retransmission processing, and the like, so as to pass the RLC PDUs to the MAC-d functional section 133.

Here, a pipeline works as a bridge between the RLC functional section 132 and the MAC-d functional section 133 is a "logical channel". The logical channel is classified based on the contents of data to be transmitted/received, and when a communication is performed, it is possible to establish a plurality of logical channels in one connection. In other words, when the communication is performed, it is possible to transmit/receive a plurality of data with different contents (for example, control data and user data, or the like) logically in parallel.

The MAC-d functional section 133 is configured to multiplex the logical channels, and to add a MAC-d header associated with the multiplex of the logical channels, so as to generate a MAC-d PDU. A plurality of MAC-d PDUs are transferred from the MAC-d functional section 133 to the MAC-e functional section 134 as MAC-d flow.

The MAC-e functional section 134 is configured to assemble a plurality of MAC-d PDUs which are received from the MAC-d functional section 133 as MAC-d flow, and to add a MAC-e header to the assembled MAC-d PDU, so as to generate a transport block. Then, the MAC-e functional section 134 is configured to pass the generated transport block to the layer-1 functional section 135 through a transport channel.

In addition, the MAC-e functional section 134 is configured to work as a lower layer of the MAC-d functional section 133, and to implement the retransmission control function according to Hybrid ARQ (HARQ) and the transmission rate control function.

Figure 8:
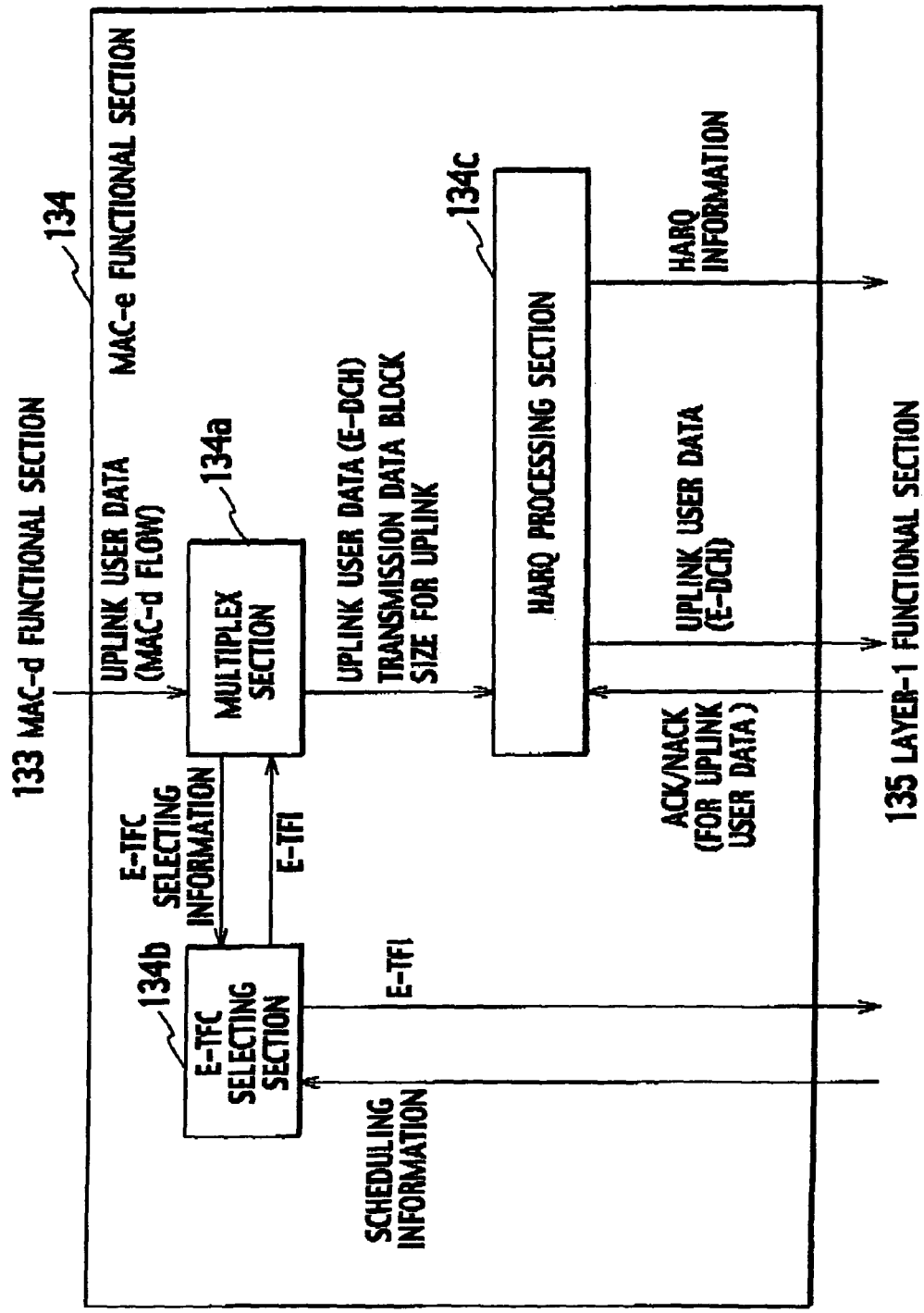
FIG. 8 is a functional block diagram of a MAC-e functional section in the baseband signal processing section of the mobile station in the mobile communication system according to the first embodiment of the present invention.

Specifically, as shown in FIG. 8, the MAC-e functional section 134 is provided with a multiplex section 134*a*, an E-TFC selecting section 134*b*, and an HARQ processing section 134*c*.

The multiplex section 134*a* is configured to perform a multiplex processing to the uplink user data, which is received from the MAC-d functional section 133 as MAC-d flow, based on a "Enhanced—Transport Format Indicator (E-TFI)" notified from the E-TFC selecting section 134*b*, so as to generate uplink user data (a Transport Block) to be transmitted via a transport channel (E-DCH). Then, the multiplex section 134*a* is configured to transmit the generated uplink user data (Transport Block) to the HARQ processing section 134*c*.

Hereinafter, the uplink user data received as MAC-d flow is indicated as the "uplink user data (MAC-d flow)", and the uplink user data to be transmitted via the transport channel (E-DCH) is indicated as the "uplink user data (E-DCH)".

The E-TFI is an identifier of a transport format, which is a format for providing the transport block on the transport channel (E-DCH) per TTI, and the E-TFI is added to the MAC-e header.

The multiplex section 134*a* is configured to determine a transmission data block size to be applied for the uplink user data based on the E-TFI notified from the E-TFC selecting section 134*b*, and to notify the determined transmission data block size to the HARQ processing section 134*c*.

In addition, when the multiplex section 134*a* receives the uplink user data from the MAC-d functional section 133 as MAC-d flow, the multiplex section 134*a* is configured to notify, to the E-TFC selecting section 134*b*, E-TFC selecting information for selecting a transport format for the received uplink user data.

Here, the B-TFC selecting information includes data size and priority class of the uplink user data, or the like.

Figure 9:
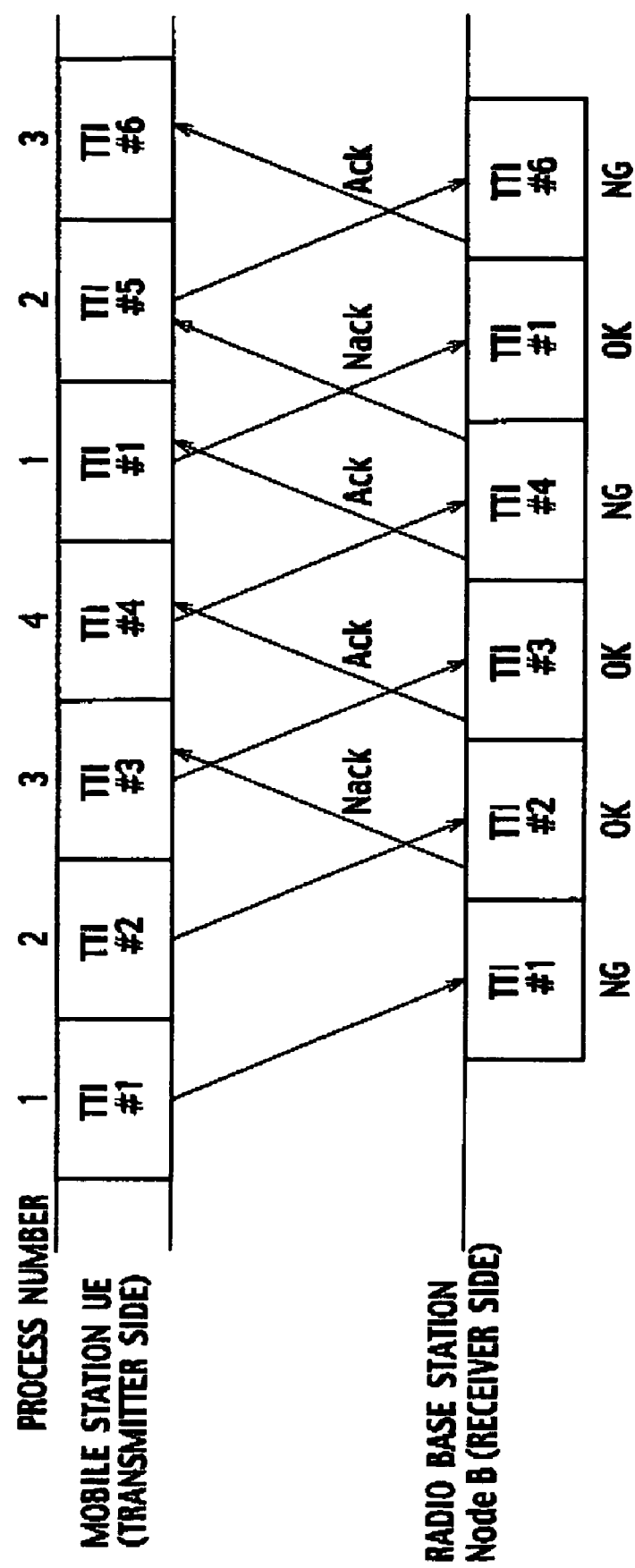
FIG. 9 is a graph illustrating an operation of the HARQ having 4 processes which is performed by an HARQ processing section in the MAC-e functional section in the baseband signal processing section of the mobile station in the mobile communication system according to the embodiment of the present invention.

The HARQ processing section 134*c* is configured to perform the retransmission control processing for the "uplink user data (S-DCH)" according to the "N channel stop and wait (N-SAW) protocol", based on ACK/NACK for the uplink user data notified from the layer-1 functional section 135. An example for operations of the HARQ having 4 processes is shown in FIG. 9.

In addition, the HARQ processing section 134*c* is configured to transmit, to the layer-1 functional section 135, the "uplink user data (E-DCH)" received from the multiplex section 134*a*, and HARQ information (for example, a number for retransmission, and the like) used for the HARQ processing.

In addition, the HARQ processing section 134*c* is configured to receive a classification result of each HARQ process from the radio network controller RNC.

In the classification result, each HARQ process is classified into any of a "scheduled transmission process", a "non-scheduled transmission process" or a "scheduled and non-scheduled transmission process" by the radio network controller RNC.

More specifically, in the "scheduled transmission process", the scheduled transmission, which transmits the uplink user data based on the transmission allocation from the radio base station Node B, is performed.

In the "non-scheduled transmission process", the non-scheduled transmission, which transmits the uplink user data automatically without following the transmission allocation from the radio base station Node B, is performed.

In the "scheduled and non-scheduled transmission process", either of the scheduled transmission or the non-scheduled transmission is performed.

Here, the transmission allocation by the radio base station Node B can be notified using scheduling information, which will be described later on, or using other method.

In addition, the HARQ processing section 134*c* is configured to transmit, to the radio base station Node B, the uplink user data in each HARQ process, by using either of the scheduled transmission or the non-scheduled transmission, based on the classification result notified from the radio network controller RNC.

Figure 10:
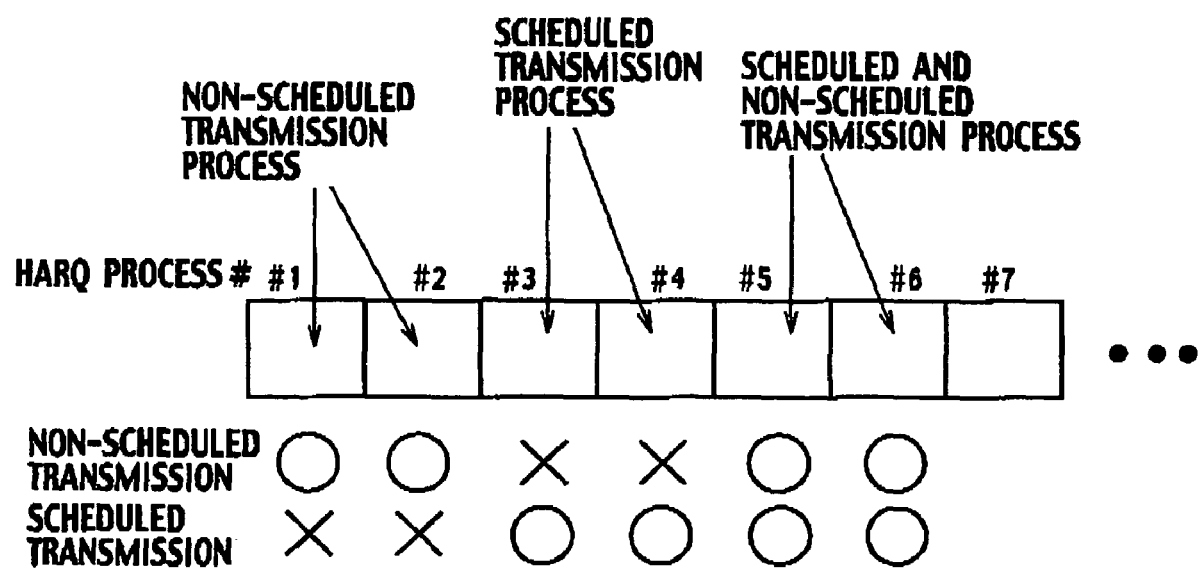
FIG. 10 is a graph illustrating an operation of the HARQ having 6 processes which is performed by an HARQ processing section in the MAC-e functional section in the baseband signal processing section of the mobile station in the mobile communication system according to the embodiment of the present invention.

In an example of FIG. 10, the HARQ processing section 134*c* determines the process #1 and #2 as the "non-scheduled transmission process", the process #3 and #4 as the "scheduled transmission process", and the process #5 and #6 as the "scheduled and non-scheduled transmission process" in the HARQ having 6 processes, based on the notification from the radio network controller RNC.

In the above case, the process #1 and #2 are configured that the non-scheduled transmission is certainly performed to the uplink user data. The process #3 and #4 are configured that the scheduled transmission is certainly performed to the uplink user data. The process #5 and #6 are configured that either of the scheduled transmission or the non-scheduled transmission can be performed to the uplink user data.

The E-TFC selecting section 134*b* is configured to determine the transmission rate of the uplink user data by selecting the transport format (E-TF) to be applied to the "uplink user data (E-DCH)".

Specifically, the E-TFC selecting section 134*b* is configured to determine whether the transmission of the uplink user data should be performed or stopped, based on scheduling information, the amount of data in MAC-d PDU, the condition of hardware resource of the radio base station Node B, and the like.

The scheduling information (such as absolute transmission rate and a relative transmission rate of the uplink user data) is received from the radio base station Node B, the amount of data in MAC-d PDU (such as data size of the uplink user data) is passed from the MAC-d functional section 133, and the condition of hardware resource of the radio base station Node B is controlled in the MAC-e functional section 134.

Then, the E-TFC selection section 134*b* is configured to select the transport format (E-TF) to be applied to the uplink user data for transmitting, and to notify the E-TFI for identifying the selected transport format to the layer-1 functional section 135 and the multiplex section 134*a*.

For example, the E-TFC selecting section 134*b* is configured to store the transmission rate of uplink user data in, association with the transport format, to update the transmission rate of uplink user data based on the scheduling information from the layer-1 functional section 135, and to notify, to the layer-1 functional section 135 and the multiplex section 134*a*, the E-TFI for identifying the transport format which is associated with the updated transmission rate of uplink user data.

Here, when the E-TFC selecting section 124*b* receives the absolute transmission rate of the uplink user data via the E-AGCH as the scheduling information, the E-TFC selecting section 134*b* is configured to change the transmission rate of the uplink user data to the received absolute transmission rate of the uplink user data.

In addition, when the E-TFC selecting section 134*b* receives the relative transmission rate of the uplink user data (Up command or Down command) via the E-ROCH as the scheduling information, the E-TFC selecting section 134*b* is configured to increase/decrease the transmission rate of the uplink user data, at the timing of receiving the relative transmission rate, by the predetermined rate based on the relative transmission rate of the uplink user data.

In addition, when the E-TFC selecting section 134b receives the relative transmission rate of the uplink user data (Don't Care command) via the E-RGCH as the scheduling information, the B-TFC selecting section 134b does not change but maintains the transmission rate of the uplink user data, at the timing of receiving the relative transmission rate.

Here, the "Up command" is information (+1) which instruct to increase the transmission rate of the uplink user data of the mobile station UE from the radio base station Node B.

The "Down command" is information (−1) which instruct to decrease the transmission rate of the uplink user data of the mobile station UE from the radio base station Node B.

The "Don't care command" is information (0) which instruct to maintain the transmission rate of the uplink user data of the mobile station UE from the radio base station Node B.

In this specification, the transmission rate of the uplink user data can be a rate which can transmit an uplink user data via an "Enhanced Dedicated Physical Data Channel (E-DPDCH)", a transmission data block size (TBS) for transmitting an uplink user data, a transmission power of an "E-DPDCH", or a transmission power ratio (a transmission power offset) between an "E-DPDCH" and a "Dedicated Physical Control Channel (DPCCH)".

Figure 11:
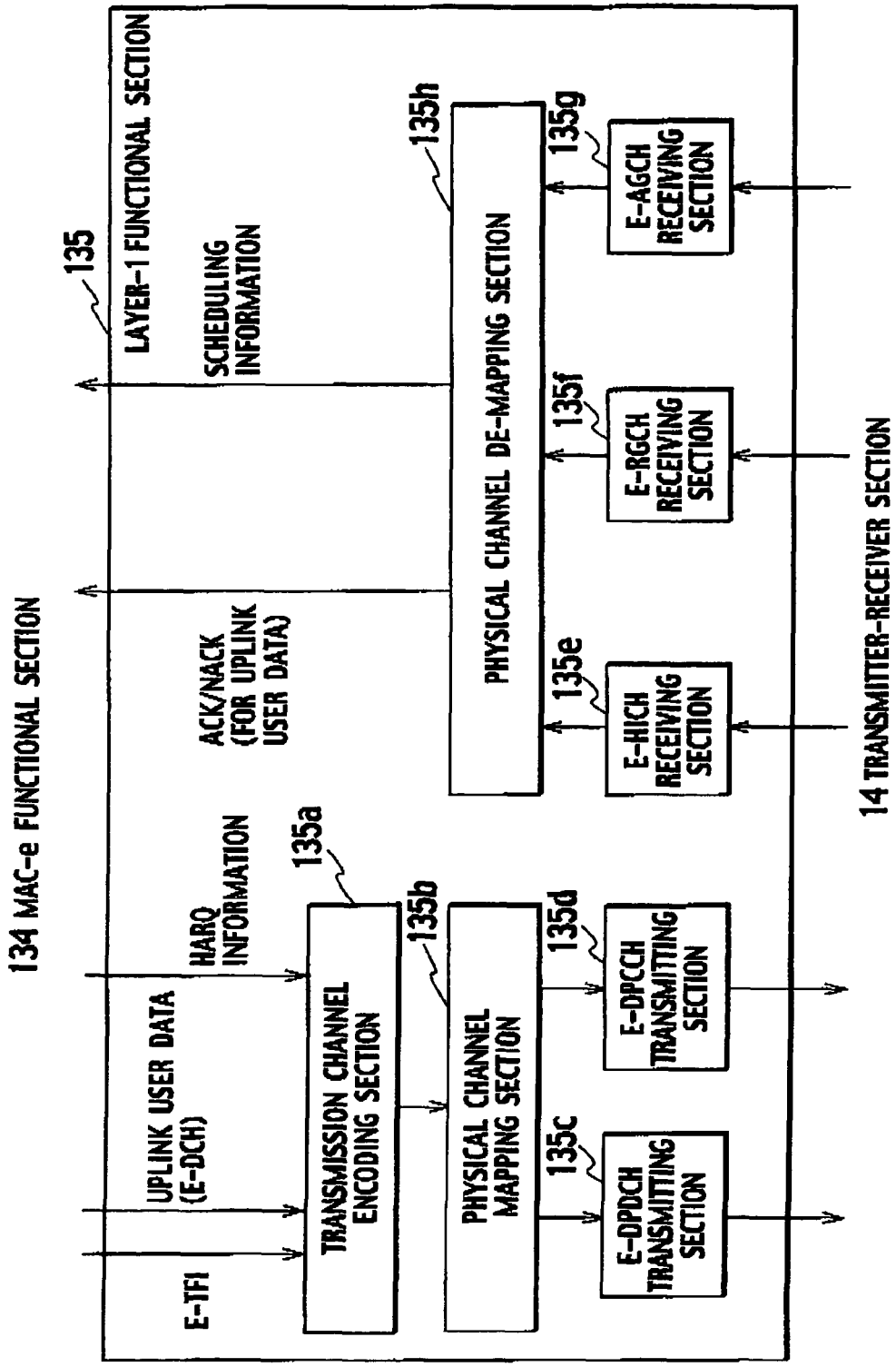
FIG. 11 is a functional block diagram of a layer-1 functional section in the baseband signal processing section of the mobile station in the mobile communication system according to the first embodiment of the present invention.

As shown in FIG. 11, the layer-1 functional section 135 is provided with a transmission channel encoding section 135a, a physical channel mapping section 135b, an E-DPDCH transmitting section 135c, an E-DPCCH transmitting section 135d, an E-HICH receiving section 135e, an E-RGCH receiving section 135f, an E-AGCH receiving section 135g, a physical channel de-mapping section 135h.

Figure 12:
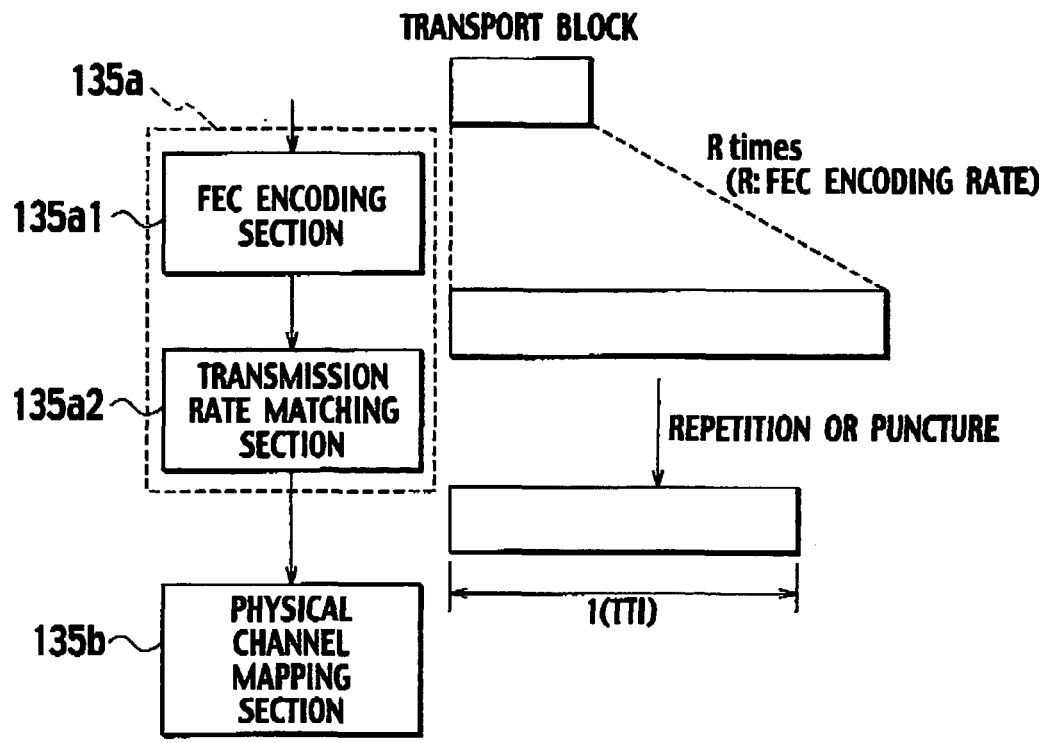
FIG. 12 is a diagram for explaining functions of the layer-1 functional section in the baseband signal processing section of the mobile station in the mobile communication system according to the first embodiment of the present invention.

As shown in FIG. 12, the transmission channel encoding section 135a is provided with a FEC (Forward Error Correction) encoding section 135a1, and a transmission rate matching section 135a2.

As shown in FIG. 12, the FEC encoding section 135a1 is configured to perform the error correction encoding processing toward the "uplink user data (E-DCH)", that is, the transport block, transmitted from the MAC-e functional section 134.

In addition, as shown in FIG. 12, the transmission rate matching section 135a2 is configured to perform, toward the transport block to which the error correction encoding processing is performed, the processing of "repetition (repeat of bit)" and "puncture (bit skipping)" in order to match to the transmission capacity in the physical channel.

The physical channel mapping section 135b is configured to pair the "uplink user data (E-DCH)" from the transmission channel encoding section 135a with the E-DPDCH, and to pair the E-TFI and the HARQ information from the transmission channel encoding section 135a with the E-DPCCH.

The E-DPDCH transmitting section 135c is configured to perform a transmission processing of the E-DPDCH.

The E-DPCCH transmitting section 135d is configured to perform a transmission processing of the E-DPCCH.

The E-HICH receiving section 135e is configured to receive an "E-DCH HARQ Acknowledgement Indicator Channel (B-HICH)" transmitted from the radio base station Node B.

The E-RGCH receiving section 135f is configured to receive the E-RGCH transmitted from the radio base station Node B (the serving cell and the non-serving cell for the mobile station UE).

The E-AGCH receiving section 135g is configured to receive the E-AGCCH transmitted from the radio base station Node B (the serving cell for the mobile station UE).

The physical channel de-mapping section 135h is configured to extract the ACK/NACK for the uplink user data which is included in the E-HICH received by the E-HICH receiving section 135e, so as to transmit the extracted ACK/NACK for the uplink user data to the MAC-e functional section 134.

In addition, the physical channel de-mapping section 135h is configured to extract the scheduling information (the relative transmission rate of the uplink user data, that is, Up command/Down command/Don't care command) which is included in the E-RGCH received by the E-RGCH receiving section 135f, so as to transmit the extracted scheduling information to the MAC-e functional section 134.

In addition, the physical channel de-mapping section 135h is configured to extract the scheduling information (the absolute transmission rate of the uplink user data) which is included in the E-AGCH received by the E-AGCH receiving section 135g, so as to transmit the extracted scheduling information to the MAC-e functional section 134.

Figure 13:
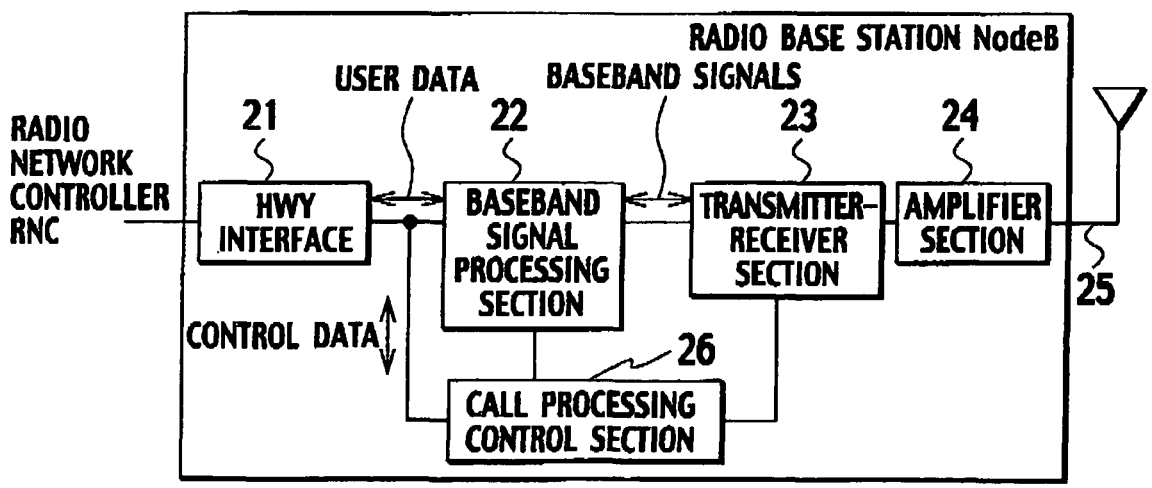
FIG. 13 is a functional block diagram of a radio base station according to the first embodiment of the present invention.

FIG. 13 shows an example of a configuration of functional blocks of a radio base station Node B according to this embodiment.

As shown in FIG. 13, the radio base station Node B according to this embodiment is provided with an HWY interface 21, a baseband signal processing section 22, a transmitter-receiver section 23, an amplifier section 24, a transmission-reception antenna 25, and a call processing control section 26.

The HWY interface 21 is configured to receive downlink user data to be transmitted from the radio network controller RNC, which is located in an upper level of the radio base station Node B, so as to enter the received downlink user data to the baseband signal processing section 22.

In addition, the HWY interface 21 is configured to transmit uplink user data from the baseband signal processing section 22 to the radio network controller RNC.

The baseband signal processing section 22 is configured perform the layer-1 processing such as channel encoding processing, spreading processing, and the like, to the downlink user data, so as to transmit the baseband signal including the downlink user data to the transmitter-receiver section 23.

In addition, the baseband signal processing section 22 is configured to perform the layer-1 processing such as despreading processing, RAKE combining processing, error correction decoding processing, and the like, to the baseband signal, which is acquired from the transmitter-receiver section 23, so as to transmit the acquired uplink user data to the HWY interface 21.

The transmitter-receiver section 23 is configured to convert the baseband signal, which is acquired from the baseband signal processing section 22, to radio frequency signals.

In addition, the transmitter-receiver section 23 is configured to convert the radio frequency signals, which are acquired from the amplifier section 24, to the baseband signals.

The amplifier section 24 is configured to amplify the radio frequency signals acquired from the transmitter-receiver section 23, so as to transmit the amplified radio frequency signals to the mobile station UE via the transmission-reception antenna 25.

In addition, the amplifier section 24 is configured to amplify the signals received by the transmission-reception antenna 25, so as to transmit the amplified signals to the transmitter-receiver section 23.

The call processing control section 26 is configured to transmit/receive the call processing control signals to/from the radio network controller RNC, and to perform the processing of condition control of each function in the radio base station Node B, allocating hardware resource in layer-3, and the like.

Figure 14:
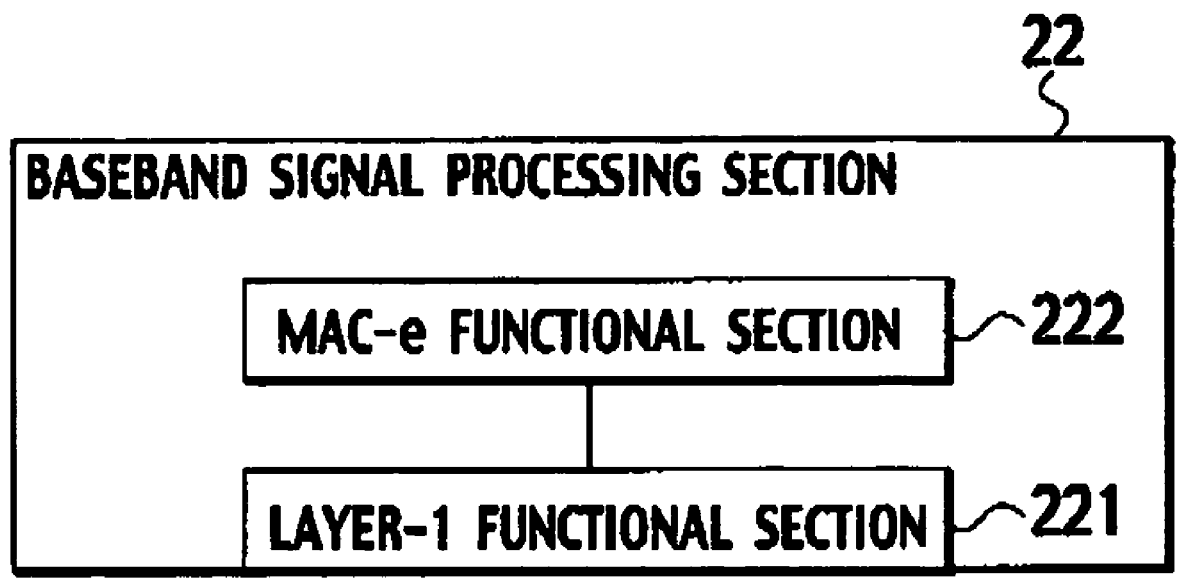
FIG. 14 is a functional block diagram of a baseband signal processing section in the radio base station of the mobile communication system according to the first embodiment of the present invention.

FIG. 14 is a functional block diagram of the baseband signal processing section 22.

As shown in FIG. 14, the baseband signal processing section 22 is provided with a layer-1 functional section 221, and a MAC-e functional section 222.

Figure 15:
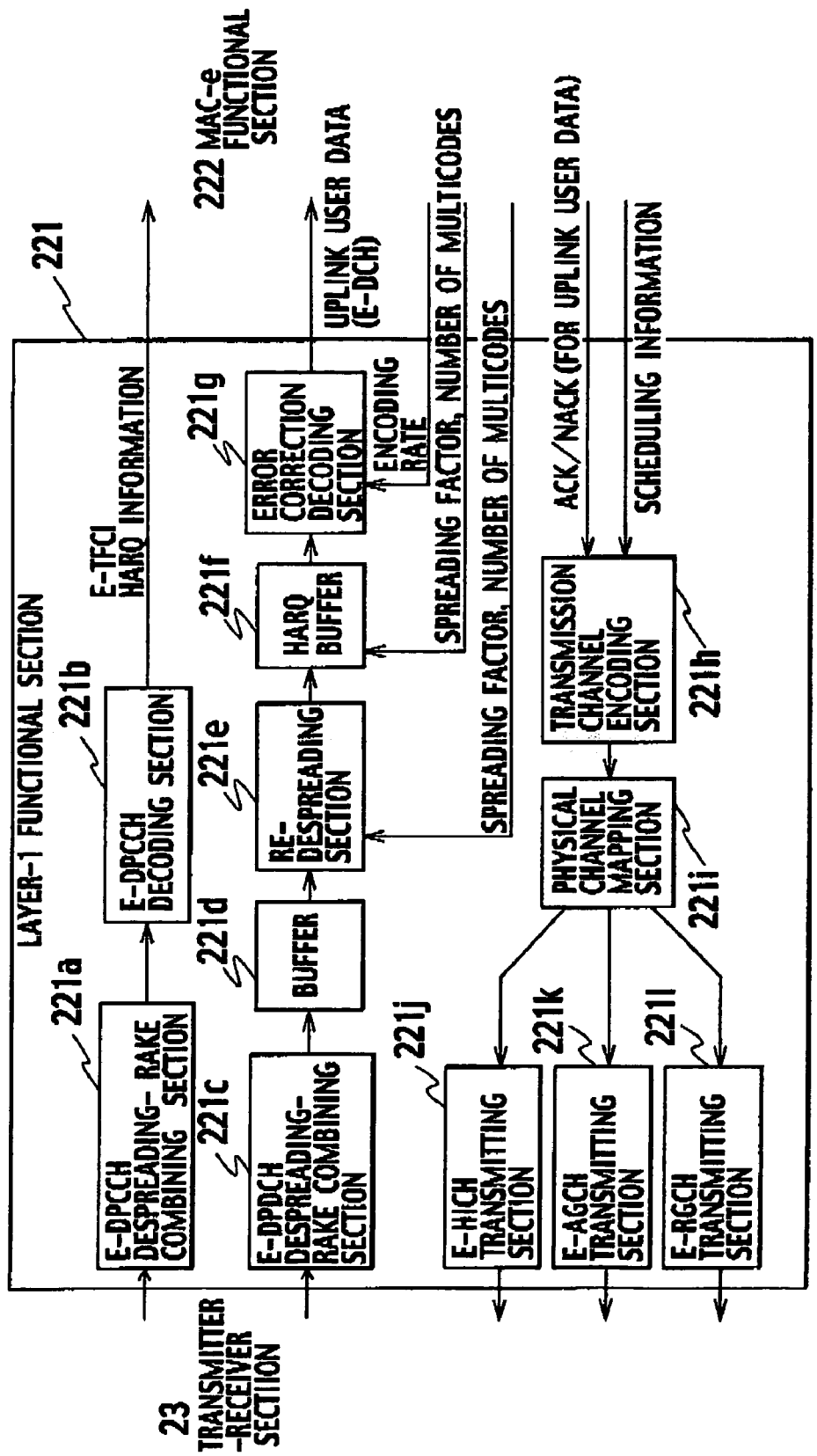
FIG. 15 is a functional block diagram of a layer-1 functional section in the baseband signal processing section in the radio base station of the mobile communication system according to the first embodiment of the present invention.

As shown in FIG. 15, the layer-1 functional section 221 is provided with an E-DPCCH despreading-RAKE combining section 221a, an E-DPCCH decoding section 221b, an E-DPDCH despreading-RAKE combining section 221c, a buffer 221d, a re-despreading section 221e, an HARQ buffer 221f, an error correction decoding section 221g, a transmission channel encoding section 221h, a physical channel mapping section 221i, an E-HICH transmitting section 221j, an E-AGCH transmitting section 221k, an E-RGCH transmitting section 221l.

However, these functions do not have to be independently present as hardware. That is, these functions can be partly or entirely integrated, or can be configured through a process of software.

The E-DPCCH despreading-RAKE combining section 221a is configured to perform the despreading processing and RAKE combining processing to the E-DPCCH.

The E-DPCCH decoding section 221b is configured to decode the E-TFCI for determining the transmission rate of the uplink user data (or an "Enhanced Transport Format and Resource Indicator (E-TFRI)" based on the output from the E-DPCCH despreading-RAKE combining section 221a, so as to transmit the decoded E-TFCI to the MAC-e functional section 222.

The E-DPDCH despreading-RAKE combining section 221c is configured to perform the despreading processing to the E-DPDCH using the spreading factor (the minimum spreading factor) and the number of multi-codes which correspond to the maximum rate that the E-DPDCH can use, so as to store the despread data to the buffer 221d. By performing the despreading processing using the above described spreading factor and the number of multi-codes, it is possible for the radio base station Node B to reserve the resources so that the radio base station Node B can receive the uplink data up to the maximum rate (bit rate) that the mobile station UE can use.

The re-despreading section 221e is configured to perform the re-despreading processing to the data stored in the buffer 221d using the spreading factor and the number of multi-codes which are notified from the MAC-e functional section 222, so as to store the re-despread data to the HARQ buffer 221f.

The error correction decoding section 221g is configured to perform the error correction decoding processing to the data stored in the HARQ buffer 221f based on the coding rate which is notified from the MAC-e functional section 222, so as to transmit the acquired "uplink user data (E-DCH)" to the MAC-e functional section 222.

The transmission channel encoding section 221h is configured to perform the necessary encoding processing to the ACK/NACK and the scheduling information for the uplink user data received from the MAC-e functional section 222.

The physical channel mapping section 221i is configured to pair the ACK/NACK for the uplink user data, which is acquired from the transmission channel encoding section 221h, with the E-HICH, to pair the scheduling information (absolute transmission rate), which is acquired from the transmission channel encoding section 221h, with the E-AGCI, and to pair the scheduling information (relative transmission rate), which is acquired from the transmission channel encoding section 221h, with the E-RGCH.

The E-HICH transmitting section 221j is configured to perform the transmission processing of the E-HICH.

The E-AGCH transmitting section 221k is configured to perform the transmission processing of the E-AGCH.

The E-RGCH transmitting section 221l is configured to perform the transmission processing of the E-RGCH.

In addition, the E-AGCH transmitting section 221k is configured to set a transmission time interval of the E-DPCH and a transmission time interval of the E-AGCH, differently. Then, the E-AGCH transmitting section 221k is configure to transmit the absolute transmission rate of the uplink user data using the set transmission time interval of the E-AGCH.

Figure 16:
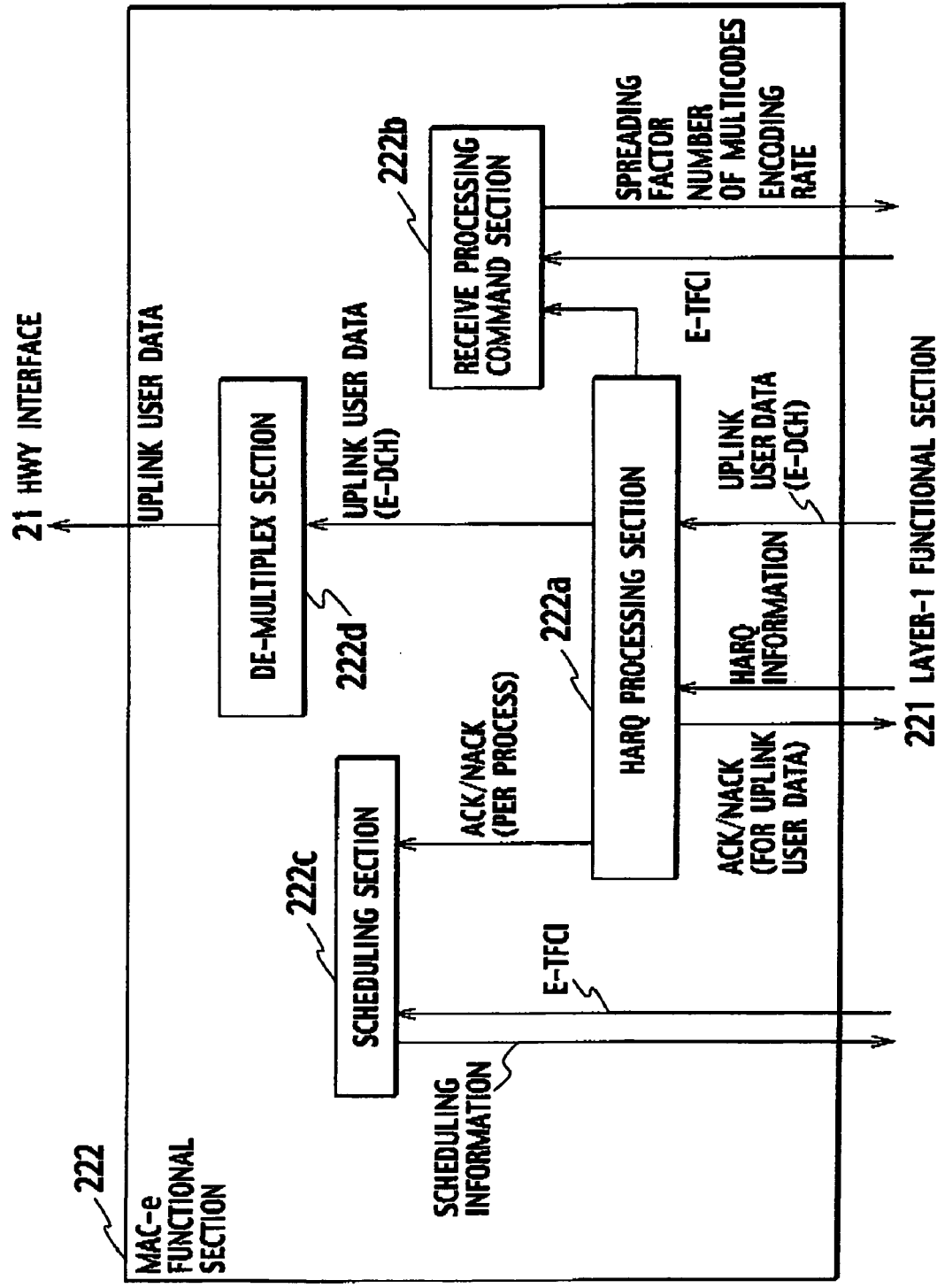
FIG. 16 is a functional block diagram of a MAC-e functional section in the baseband signal processing section in the radio base station of the communication system according to the first embodiment of the present invention.

As shown in FIG. 16, the MAC-e functional section 222 is provided with an HARQ processing section 222a, a receive processing command section 222b, a scheduling section 222c, a de-multiplex section 222d.

The HARQ processing section 222a is configured to receive the uplink user data and the HARQ information which are received from the layer-1 functional section 221, so as to perform the HARQ processing on the "uplink user data (E-DCH)".

In addition, the HARQ processing section 222a is configured to notify, to the layer-1 functional section 221, the ACK/NACK (for the uplink user data) which shows the result of receive processing on the "uplink user data (E-DCH)".

In addition, the HARQ processing section 222a is configured to notify, to the scheduling section 222c, the ACK/NACK (for the uplink user data) per process.

In addition, the HARQ processing section 222a is configured to receive the classification result of each HARQ process which is classified into any of the "scheduled transmission process", the "non-scheduled transmission process", and the "scheduled and non-scheduled transmission process" by the radio network controller RNC.

In addition, the HARQ processing section 222a is configured to perform the transmission allocation of the uplink user data to the mobile station UE, based on the classification result notified by the radio network controller RNC, in each HARQ process.

For example, the HARQ processing section 222a is configured to perform the transmission allocation of the uplink user data to the mobile station UE only in the processes which are classified as either of the "scheduled transmission process" or the "scheduled and non-scheduled transmission process".

Further, the HARQ processing section 222a is configured not to perform the transmission allocation of the uplink user data to the mobile station UE in the processes which are classified as the "non-scheduled transmission process".

The receive processing command section 222b is configured to notify, to the re-despreading section 221e and the HARQ buffer 221f, the spreading factor and the number of multi-codes for the transport format of each mobile station UE, which is specified by the E-TFCI per TTI received from the E-DPCCH decoding section 221b in the layer-1 functional section 221 Then, the receive processing command section 222b is configured to notify the encoding rate to the error correction decoding section 221g.

The scheduling section 222c is configured to change the absolute transmission rate or the relative transmission rate of the uplink user data, based on the E-TFCI per TTI received from the E-DPCCH decoding section 221b in the layer-1 functional section 221, the ACK/NACK per process received from the HARQ processing section 222a, the interference level, and the like.

In addition, the scheduling section 222c is configured to notify, to the layer-1 functional section 221 via the DCH, the absolute transmission rate or the relative transmission rate of the uplink user data, as the scheduling information.

In addition, the scheduling section 222c can be configured to notify, to the layer-1 functional section 221 via the DCH, the result of the transmission allocation of the uplink user data to the mobile station UE, as the scheduling information.

The de-multiplex section 222d is configured to perform the de-multiplex processing to the "uplink user data (E-DCH)" received from the HARQ processing section 222a, so as to transmit the acquired uplink user data to the HWY interface 21.

The radio network controller RNC according to this embodiment is an apparatus located in an upper level of the radio base station Node B, and is configured to control radio communications between the radio base station Node B and the mobile station UE.

Figure 17:
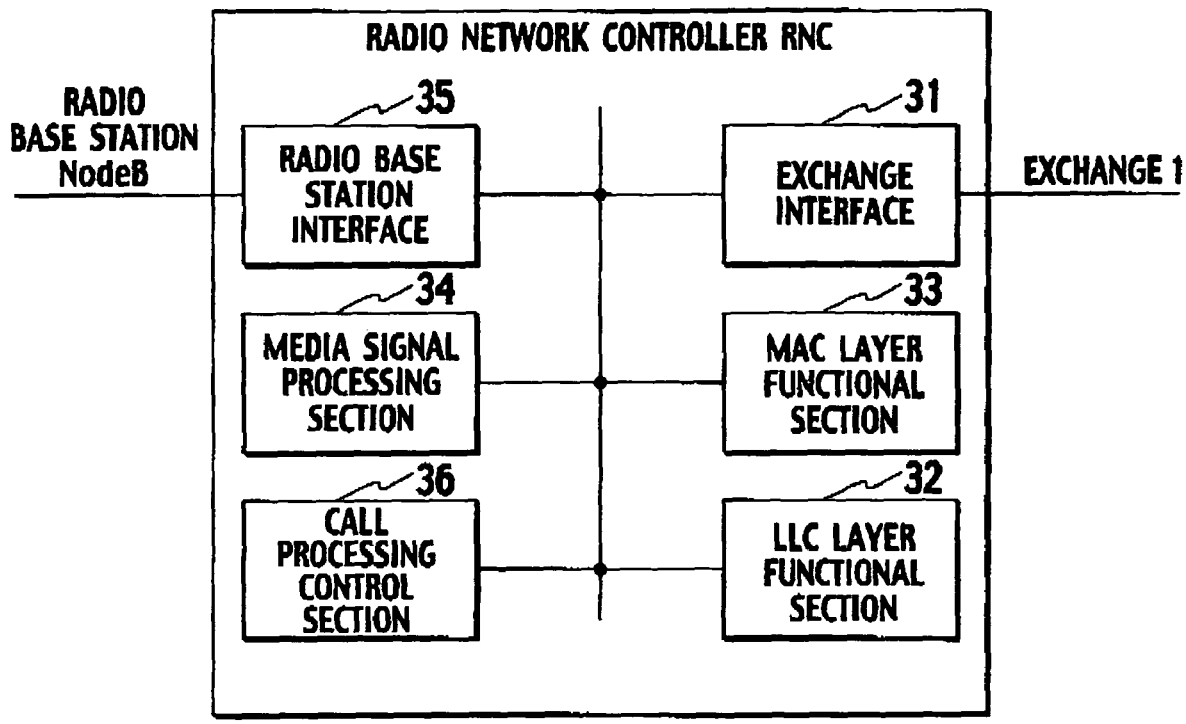
FIG. 17 is a functional block diagram of a radio network controller of the mobile communication system according to the first embodiment of the present invention.

As shown in FIG. 17, the radio network controller RNC according to this embodiment is provided with an exchange interface 31, a Logical Link Control (LLC) layer functional section 32, a MAC layer functional section 33, a media signal processing section 34, a radio base station interface 35, and a call processing control section 36.

The exchange interface 31 is an interface with an exchange 1, and is configured to forward the downlink signals transmitted from the exchange 1 to the LLC layer functional section 32, and to forward the uplink signals transmitted from the LLC layer functional section 32 to the exchange 1.

The LLC layer functional section 32 is configured to perform an LLC sub-layer processing such as a combining processing of a header or a trailer such as a sequence pattern number.

The LLC layer functional section 32 is also configured to transmit the uplink signals to the exchange interface 31 and to transmit the downlink signals to the MAC layer functional section 33, after the LLC sub-layer processing is performed.

The MAC layer functional section 33 is configured to perform a MAC layer processing such as a priority control processing or a header adding processing.

The MAC layer functional section 33 is also configured to transmit the uplink signals to the LLC layer functional section 32 and to transmit the downlink signals to the radio base station interface 35 (or the media signal processing section 34), after the MAC layer processing is performed.

The media signal processing section 34 is configured to perform a media signal processing against voice signals or real time image signals.

The media signal processing section 34 is also configured to transmit the uplink signals to the MAC layer functional section 33 and to transmit the downlink signals to the radio base station interface 35, after the media signal processing is performed.

The radio base station interface 35 is an interface with the radio base station Node B. The radio base station interface 35 is configured to forward the uplink signals transmitted from the radio base station Node B to the MAC layer functional section 33 (or the media signal processing section 34) and to forward the downlink signals transmitted from the MAC layer functional section 33 (or the media signal processing section 34) to the radio base station Node B.

The call processing control section 36 is configured to perform a radio resource control processing, a channel setup and release processing by the layer-3 signaling, or the like. Here, the radio resource control includes call admission control, handover control, or the like.

In addition, the call processing control section 36 is configured to classify the each HARQ process into any of the "scheduled transmission process", the "non-scheduled transmission process" or the "scheduled and non-scheduled transmission process".

Then, the call processing control section 36 is configured to notify the result of the above classification to the mobile station UE and the radio base station Node B, when the communication between the mobile station UE and the radio base station Node B is started.

Operations of Mobile Communication System According to First Embodiment of the Present Invention Referring to FIG. 18, operations of the mobile communication system according to this embodiment will be described. Specifically, the operations of controlling the transmission of the uplink user data in the mobile communication system according to this embodiment will be described.

Figure 18:
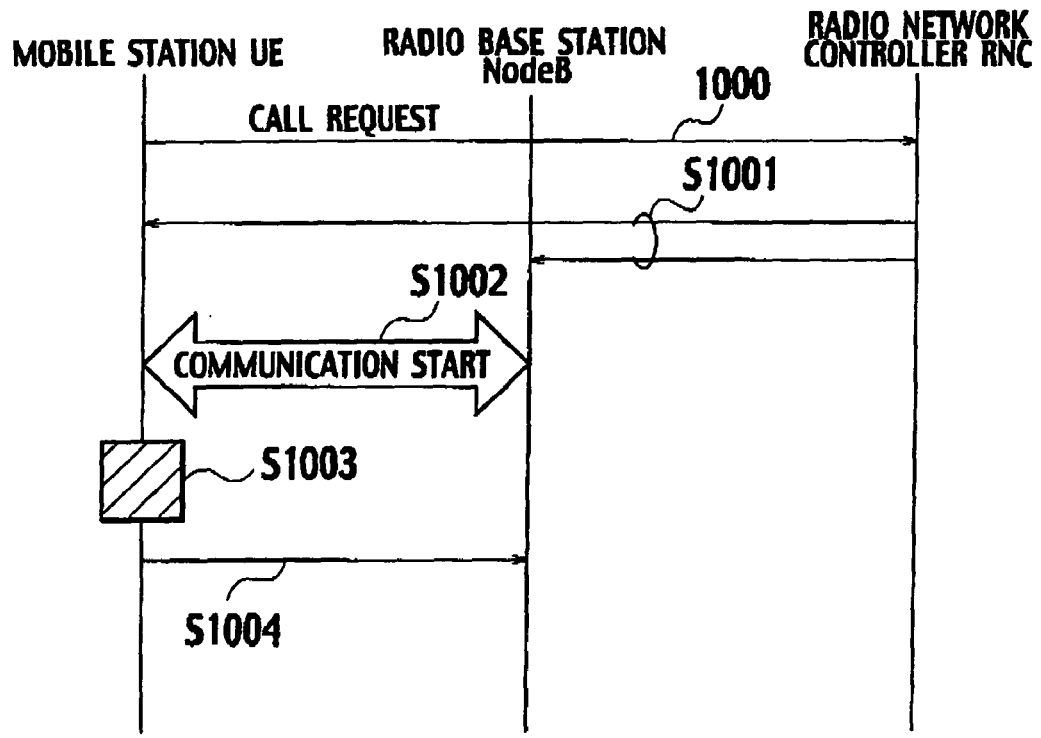
FIG. 18 is a sequence diagram showing operations of transmission rate control method in the mobile communication system according to the first embodiment of the present invention.

As shown in FIG. 18, in step S1000, the mobile station UE transmits, to the radio network controller RNC, a call request for starting radio communication with the radio base station Node B.

In step S1001, the radio network controller RNC notifies the classification result for each HARQ process (the "scheduled transmission process", the "non-scheduled transmission process", or the "scheduled and non-scheduled transmission process") to the mobile station UE and the radio base station Node B.

In step S1002, the radio communication between the mobile station UE and the radio base station Node B is started.

In step S1003, the mobile station UE determines whether the scheduled transmission or the non-scheduled transmission should be performed in each HARQ process, based on the classification (the "scheduled transmission process", the "non-scheduled transmission process", or the "scheduled and non-scheduled transmission process") which is applied to each HARQ process.

In step S1004, the mobile station UE transmit the uplink user data to the radio base station Node B, by using either of the scheduled transmission or the non-scheduled transmission based on the result of above determination.

Effects of Mobile Communication System According to First Embodiment of the Present Invention According to the present invention, it is possible to provide a transmission control method for uplink user data which enables to simultaneously set the transmission rate of the scheduled transmission appropriately and decrease hardware resources for reception in the non-scheduled transmission, and a mobile station, a radio base station, and a radio network controller.

In other words, according to the mobile communication system of the present invention, the mobile station UE is configured to transmit the uplink user data to the radio base station Node B, by using either of the scheduled transmission or the non-scheduled transmission, based on the classification of process classified by the radio network controller RNC. Therefore, it is possible to decrease hardware resources for reception in the non-scheduled transmission as well as to set the transmission rate of the scheduled transmission appropriately, at the same time.

Additional advantages and modifications will readily occur to those skilled in the art. Therefore, the invention in its broader aspects is not limited to the specific details and the representative embodiments shown and described herein. Accordingly, various modifications may be made without departing from the scope of the general inventive concept as defined by the appended claims and their equivalents.

What is claimed is:

1. A transmission control method for uplink user data in a mobile communication system in which a plurality of HARQ processes is applied to the uplink user data to be transmitted from a mobile station to a radio base station, comprising:

notifying, from the radio network controller to the mobile station, at least one of an HARQ process applying a scheduled transmission process, an HARQ process applying a non-scheduled transmission process, and an HARQ process applying a scheduled and non-scheduled transmission process; and transmitting, at the mobile station, the uplink user data in each HARQ process to the radio base station using at least one of a scheduled transmission and a non-scheduled transmission, based on the notification; wherein in the scheduled transmission process, the scheduled transmission for transmitting the uplink user data based on a transmission allocation by the radio base station, is performed;

in the non-scheduled transmission process, the non-scheduled transmission for transmitting the uplink user data automatically without following the transmission allocation by the radio base station, is performed, and in the scheduled and non-scheduled transmission process, at least one of the scheduled transmission and the non-scheduled transmission, are performed.

2. A mobile station used in a mobile communication system in which a plurality of HARQ processes is applied to the uplink user data to be transmitted from the mobile station to a radio base station, comprising:

a classification result receiver configured to receive a classification result in which each HARQ process is classified into any of: a scheduled transmission process in which a scheduled transmission for transmitting the uplink user data based on a transmission allocation by the radio base station both are performed; a non-scheduled transmission process in which a non-scheduled transmission for transmitting the uplink user data automatically without following the transmission allocation by the radio base station is performed; and a scheduled and non-scheduled transmission process in which at least one of the scheduled transmission and the non-scheduled transmission is performed, by a radio network controller; and an uplink user data transmitter configured to transmit the uplink user data in each HARQ process to the radio base station using only a scheduled transmission when the received classification result indicates the scheduled transmission process, only a non-scheduled transmission when the received classification result indicates the non-scheduled transmission process, and either of a scheduled and non-scheduled transmission when the received classification result indicates the scheduled non-scheduled transmission process.

3. A radio base station used in a mobile communication system in which a plurality of HARQ processes is applied to the uplink user data to be transmitted from the mobile station to a radio base station, comprising:

a classification result receiver configured to receive a classification result in which each HARQ process is classified into any of: a scheduled transmission process in which a scheduled transmission for transmitting the uplink user data based on a transmission allocation by the radio base station is performed; a non-scheduled transmission process in which a non-scheduled transmission for transmitting the uplink user data automatically without following the transmission allocation by the radio base station is performed; and a scheduled and non-scheduled transmission process in which at least one of the scheduled transmission and the non-scheduled transmission is performed, by a radio network controller; and a transmission allocator configured to perform transmission allocation to the uplink user data in each HARQ process to the mobile station, based on the classification result notified from the radio network controller.

4. A radio network controller used in a mobile communication system in which a plurality of HARQ processes is applied to uplink user data to be transmitted from the mobile station to a radio base station, comprising:

a classifier configured to classify each HARQ process into any of a scheduled transmission process in which a scheduled transmission for transmitting the uplink user data based on a transmission allocation by the radio base station is performed; a non-scheduled transmission process in which a non-scheduled transmission for transmitting the uplink user data automatically without following the transmission allocation by the radio base station is performed and a scheduled and non-scheduled transmission process in which at least one of the scheduled transmission and the non-scheduled transmission are performed; and a notifier configured to notify a classification result to the mobile station.

* * * * *

UNITED STATES PATENT AND TRADEMARK OFFICE
CERTIFICATE OF CORRECTION

| | | |
|---|---|---|
| PATENT NO. | : 7,885,265 B2 | Page 1 of 1 |
| APPLICATION NO. | : 11/511217 | |
| DATED | : February 8, 2011 | |
| INVENTOR(S) | : Masafumi Usuda and Anil Umesh | |

It is certified that error appears in the above-identified patent and that said Letters Patent is hereby corrected as shown below:

Col. 15, in claim 1, line 30, cancel the first occurrence of ","

Col. 15, in claim 1, line 32, the phrase "at least one" should be changed to --both--

Col. 15, in claim 1, line 33, cancel ","

Col. 15, in claim 2, line 35, the word "is" should be changed to --are--

Col. 15, in claim 2, line 43, the phrase "both are" should be changed to --is--

Signed and Sealed this
Fifteenth Day of May, 2012

David J. Kappos
*Director of the United States Patent and Trademark Office*